(12) United States Patent
Watson et al.

(10) Patent No.: US 12,198,163 B2
(45) Date of Patent: *Jan. 14, 2025

(54) DYNAMIC SELECTION OF ADVERTISEMENTS USING DEEP LEARNING MODELS ON CLIENT DEVICES

(71) Applicant: Capital One Services, LLC, McLean, VA (US)

(72) Inventors: Mark Louis Watson, Urbana, IL (US); Galen Rafferty, Mahomet, IL (US); Austin Grant Walters, Savoy, IL (US); Jeremy Edward Goodsitt, Champaign, IL (US); Anh Truong, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 165 days.

This patent is subject to a terminal disclaimer.

(21) Appl. No.: 17/727,957

(22) Filed: Apr. 25, 2022

(65) Prior Publication Data

US 2022/0301019 A1 Sep. 22, 2022

Related U.S. Application Data

(63) Continuation of application No. 16/454,375, filed on Jun. 27, 2019, now Pat. No. 11,348,143.

(51) Int. Cl.
*G06Q 30/0241* (2023.01)
*G06N 20/00* (2019.01)

(52) U.S. Cl.
CPC ......... *G06Q 30/0277* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2017/0161640 A1* | 6/2017 | Shamir | G06N 20/00 |
| 2018/0253759 A1* | 9/2018 | Deng | G06Q 30/0243 |
| 2019/0082220 A1* | 3/2019 | Ouyang | G06Q 30/0251 |

(Continued)

*Primary Examiner* — Chrystina E Zelaskiewicz
(74) *Attorney, Agent, or Firm* — KDW FIRM PLLC

(57) ABSTRACT

Systems, methods, and computer program products to transmit, by a web browser to a web server, a hypertext transfer protocol request for a web page at a first uniform resource identifier (URI). The web browser may receive, from the web server via, the web page and metadata of a plurality of candidate advertisements, the plurality of candidate advertisements determined based on a master machine learning (ML) model. A client ML model executing in the web browser may process the received metadata, the client ML model trained based on prior interactions between one or more users of the web browser and a plurality of previously displayed advertisements. The client ML model may determine based on the processing, a first candidate advertisement of the plurality of candidate advertisements to display in the web browser with the received web page. The web browser may receive, from a second URI, the first candidate advertisement of the plurality of candidate advertisements and output the web page and the first candidate advertisement on a display device.

20 Claims, 10 Drawing Sheets

(56) References Cited

U.S. PATENT DOCUMENTS

| | | | |
|---|---|---|---|
| 2020/0201727 A1* | 6/2020 | Nie | G06N 20/00 |
| 2021/0318898 A1* | 10/2021 | Mitra | G06F 9/547 |
| 2022/0012601 A1* | 1/2022 | Amad-Ud-Din | G06N 5/01 |
| 2022/0237516 A1* | 7/2022 | Schmidt | G06N 5/022 |
| 2024/0086971 A1* | 3/2024 | Saraee | G06N 3/084 |

* cited by examiner

DYNAMIC SELECTION OF ADVERTISEMENTS USING DEEP LEARNING MODELS ON CLIENT DEVICES

RELATED APPLICATIONS

This application is a Continuation of U.S. patent application Ser. No. 16/454,375, filed on Jun. 27, 2019, the contents of which are incorporated herein by reference in their entirety.

TECHNICAL FIELD

Embodiments herein generally relate to computing services, and more specifically, to dynamically selecting advertisements on client devices using deep learning models executing in a web browser on the client devices.

BACKGROUND

Providing server-side hardware and/or software to determine which ads are most likely to be selected by a user is costly and requires significant overhead. Furthermore, the server-side solutions require state data for millions of users to be maintained at all times. Similarly, the user experience may suffer from extended load times when waiting on the server to determine which ads to serve to the user.

SUMMARY

Embodiments disclosed herein provide systems, methods, articles of manufacture, and computer-readable media for dynamic selection of advertisements devices using deep learning models on client devices. In one example, a web browser may transmit, to a web server, a hypertext transfer protocol (HTTP) request for a web page at a first uniform resource identifier (URI). The web browser may receive from the web server via a network, the web page at the first URI and metadata of a plurality of candidate advertisements to display in the web browser with the web page, the plurality of candidate advertisements determined by the web server based on a master machine learning (ML) model trained based on a plurality of users. A client ML model executing in the web browser may process the received metadata of the plurality of candidate advertisements, the client ML model trained based on data stored by the web browser describing prior interactions between one or more users of the web browser and a plurality of previously displayed advertisements. The client ML model may determine based on the processing, a first candidate advertisement of the plurality of candidate advertisements to display in the web browser with the received web page. The web browser may receive, from a second URI, the first candidate advertisement of the plurality of candidate advertisements. The web browser may output the received web page and the first candidate advertisement for display on a display device.

DETAILED DESCRIPTION

Figure 1A:
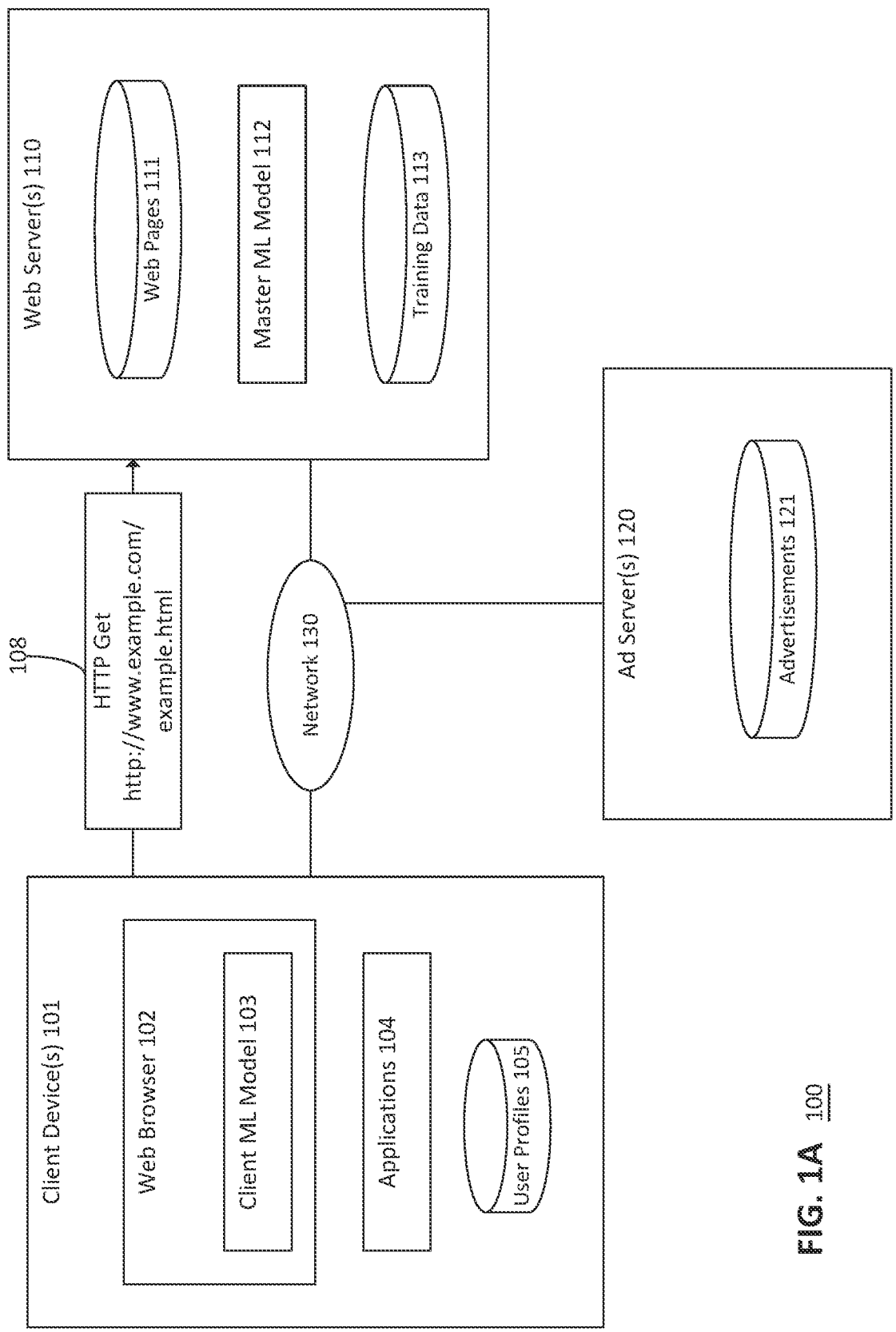
FIGS. 1A-1D illustrate embodiments of a system that provides dynamic selection of advertisements using deep learning models on client devices.

Embodiments disclosed herein provide techniques to dynamically select tailored advertisements based on deep learning models executing on client devices. For example, a user of a web browser executing on a client device may specify to load an example webpage. A web server may receive a request for the webpage from the web browser and respond to the web browser with the webpage and indications of one or more candidate advertisements to display with the webpage. The web server may select the candidate advertisements based on a master model that has been trained based on a plurality of users. The web browser may provide the indications of the candidate advertisements to a client model executing in the web browser of the client device. The client model may be trained based on one or more users of the client device. Generally, the client model may select the most relevant advertisements for the requesting user based on metadata for each candidate advertisements and metadata describing the user. The web browser may then receive the selected advertisements (e.g., from an ad server) and display the selected advertisements with the webpage.

Advantageously, embodiments disclosed herein provide enhanced techniques to select targeted advertisements by leveraging deep learning models executing on client devices. By executing the deep learning models on a client device, rather than a server, embodiments disclosed herein advantageously reduce costs associated with executing the models on the server. Furthermore, by executing the deep learning models on the client device, embodiments disclosed herein may provide targeted advertisement selections faster than embodiments where deep learning models are executed on the server. Further still, by maintaining client data on the client device, rather than the server, the privacy of client data is enhanced, which may assist with compliance with data privacy laws.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more client devices 101, one or more web servers 110, and one or more ad servers 120 communicably coupled via a network 130. The client devices 101, web servers 110, and ad servers 120 are representative of any type of computing system and/or computing system component, such as servers, compute clusters, desktop computers, smartphones, tablet computers, wearable devices, laptop computers, workstations, portable gaming devices, virtualized computing systems, applications, and the like. The client devices 101, web servers 110, and ad servers 120 include processors, memory, storage, network interfaces, and/or other components not pictured for the sake of clarity. In one embodiment, the web servers 110 and ad servers 120 are representative of applications executing on one or more processors.

As shown, the client devices 101 include a web browser 102, one or more applications 104, and one or more user profiles 105. The web browser 102 is an application for accessing resources such as the web pages 111 stored by the web servers 110. The applications 104 are representative of any type of application, such as social media applications, productivity applications, communication applications, and the like. The user profiles 105 store data describing one or more users associated with the respective client device 101. For example, the user profiles 105 may store interests, preferences, clickthrough data describing whether a user clicks on an advertisement or other resource in the web browser 102, browsing data, data describing the applications 104 installed on the device 101, and the like. In at least one embodiment, the user profiles 105 are generated, managed, and/or stored by the web browser 102. In some such embodiments, the user profiles 105 are stored in a local memory (not pictured) of the client device 101 (and/or another local storage location). For example, the user profiles 105 may be stored in a containerized memory of the web browser 102. As another example, the user profiles 105 may be stored in one or more cookie files. More generally, the user profiles 105 may be stored in any memory structure provided by the web browser 102, such as user storage, which may be accessible across multiple devices 101 associated with a given user.

As shown, the web browser 102 includes one or more client machine learning (ML) models 103. The client ML models 103 may be stored in a local memory of the client device 101 (and/or another local storage location). For example, the client ML models 103 may be stored in a containerized memory of the web browser 102, the user storage, or any memory structure provided by the web browser 102. The client ML models 103 are representative of any type of deep learning model, such as neural networks, classifiers, clustering algorithms, support vector machines, and the like. The use of machine learning models as a reference example herein should not be considered limiting of the disclosure as the disclosure is equally applicable to any type of deep learning model. The client ML models 103 may initially be based on one or more master ML models 112. A master ML model 112 may generally be associated with one or more web pages 111, such as a web domain, web portal, and the like, and is trained based on the training data 113 collected for the associated web pages 111 (e.g., of the domain, portal, etc.). Stated differently, the master ML model 112 is trained based on training data 113 describing interactions between a plurality of different users when visiting different web pages 111.

For example, a bank may have a collection of web pages 111 stored on one or more web servers 110. When a user views a web page 111, one or more advertisements 121 may be displayed with the web page 111 in a web browser 102. The web server 110 and/or ad server 120 may monitor web analytics, including what web pages 111 a user visits and whether the user clicks on the one or more advertisements 121 displayed with the web page 111. Based on the monitoring, a corresponding indication may be stored in the training data 113. For example, if an advertisement 121 for mortgage services is displayed on the home web page 111 for the bank, the web server 110 may store indications in the training data 113 reflecting whether each user viewing the home web page 111 clicks on the displayed advertisement for mortgage services. The indications stored in the training data 113 may include additional metadata for each visitor to the web pages 111, such as internet protocol (IP) addresses, data from user profiles 105, a unique identifier for the displayed advertisement, a category of the advertisement (e.g., sports, finance, etc.), a merchant (or other entity) associated with the advertisement, and the like.

A machine learning algorithm may then be used to process the training data 113 to produce a master ML model 112 for the associated web pages 111. Once trained, the master ML model 112 may include a plurality of features and associated weights. As explained in greater detail below, the trained master ML model 112 may then be used by the web server 110 to select one or more candidate advertisements to display on a client device 101 that requests a web page 111. More generally, the training data 113 may include additional data, such as browsing data (e.g., which web pages 111 are viewed), data describing the client devices 101 (e.g., device type, operating system type, etc.), and the like.

Initially, a master ML model 112 may be transmitted to a client device 101 that does not include an instance of a client ML model 103. For example, a first-time visitor to the bank's home web page 111 may create an account and receive the master ML model 112 from a web server 110 associated with the bank. The master ML model 112 may then be trained using an ML algorithm and data in the user profiles 105 to generate a client ML model 103 for the user. The trained client ML model 103 may generally include features and associated weights that are tailored to one or more users associated with a user profile 105 on a given client device 101. Doing so allows the client ML model 103 to determine which advertisements 121 are most relevant to the associated user while the master ML model 112 determines which advertisements 121 are most relevant across all users.

Over time, the client ML model 103 may be retrained periodically based on the user profile 105, which reflects the most recent browsing, clickthrough, and other data describing the associated user(s). Furthermore, the client ML model 103 may be retrained based on updated data received from the web servers 110, e.g., clickthrough data for the web pages 111, browsing histories, data describing each visitor to the web pages 111, and/or updated versions of the master ML model 112. When retrained, the client ML model 103 reflects a likelihood that a given advertisement 121 will be selected by the specific user associated with a user profile 105 when visiting a web page 111. Similarly, the master ML model 112 may be periodically retrained based on data gathered by the web servers 110 and/or ad servers 120 (e.g., clickthrough data, browsing data, etc.). When retrained, the master ML model 112 reflects a likelihood that a given advertisement 121 will be selected by any user visiting a web page 111.

Furthermore, the client ML model 103 may be modified by reducing the number and/or types of features and/or weights, which may generally be referred to as regularization. For example, if an attribute "x" learned by the client ML model 103 is not relevant to determining whether the user will select an advertisement, the attribute "x" may be removed from the client ML model 103. Similarly, if an attribute "y" is a 32 bit floating point integer but such precision is not required when determining whether a user will select an advertisement 121, the attribute "y" may be converted to a data type of lower precision (e.g., an 8-bit integer).

Although depicted as being stored on the ad server 120, in some embodiments, the advertisements 121 may be stored by the web server 110. The web pages 111 may include executable code that facilitate the deep learning techniques described herein. For example, the web pages 111 may include executable code to invoke the client ML model 103 to select one or more advertisements 121, executable code to invoke updating of the client ML model 103 (e.g., based on new browsing data, clickthrough data, etc., stored in the user profiles 105), and the like. In at least one embodiment, the client ML models 103 and/or the master ML models 112 are based on the TensorFlow® platform. In some embodiments, the client ML models 103 leverage the TensorFlow.js Javascript® library for execution in the web browser 102. In yet some other embodiments, the client ML models 103 may leverage the TensorFlow Lite library for execution on mobile and/or embedded devices.

More generally, in operation, a user of a web browser 102 on a client device 101 may specify to access a web page 111 stored on a web server 110. For example, the web page 111 may be associated with a uniform resource identifier (URI) of "http:///www.example.com/example.html". As depicted in FIG. 1A, doing so may cause the web browser 102 to generate a hypertext transfer protocol (HTTP) request 108 for the URI, which may be transmitted to the web server 110 via the network 130. Once received, the web server 110 may use the master ML model 112 to determine one or more candidate advertisements 121 to display in the requested web page 111. For example, the master ML model 112 may receive the requested URI as input and output a list of candidate advertisements to display in the requested web page 111. In some embodiments, the master ML model 112 may receive additional input, such as an IP address of the client device 101, data from the user profiles 105, etc.

Figure 1B:
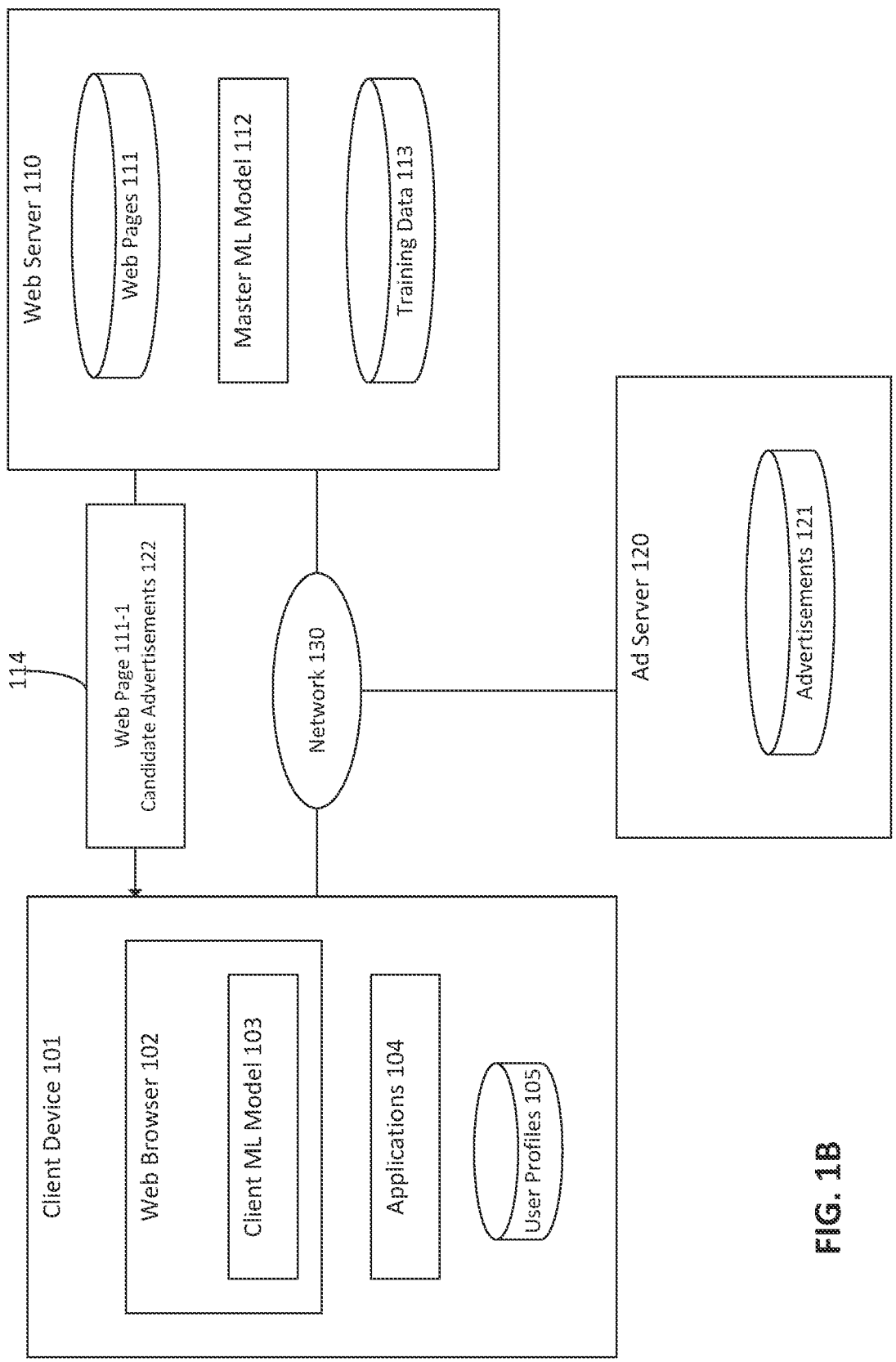

FIG. 1B depicts an embodiment where the web server 110 transmits an HTTP response 114 to the client device 101 in response to the HTTP request 108. The HTTP response 114 may include the requested web page 111 (web page 111-1 in this example) and one or more candidate advertisements 122. In one embodiment, the candidate advertisements 122 may comprise one or more identifiers of the determined advertisements 121 (e.g., a unique identifier, a URI, and/or metadata). In some embodiments, the candidate advertisements 122 may include the corresponding advertisements 121 themselves (e.g., graphics, links, images, videos, etc.), which may be cached on the client device 101 for later use.

Figure 1C:
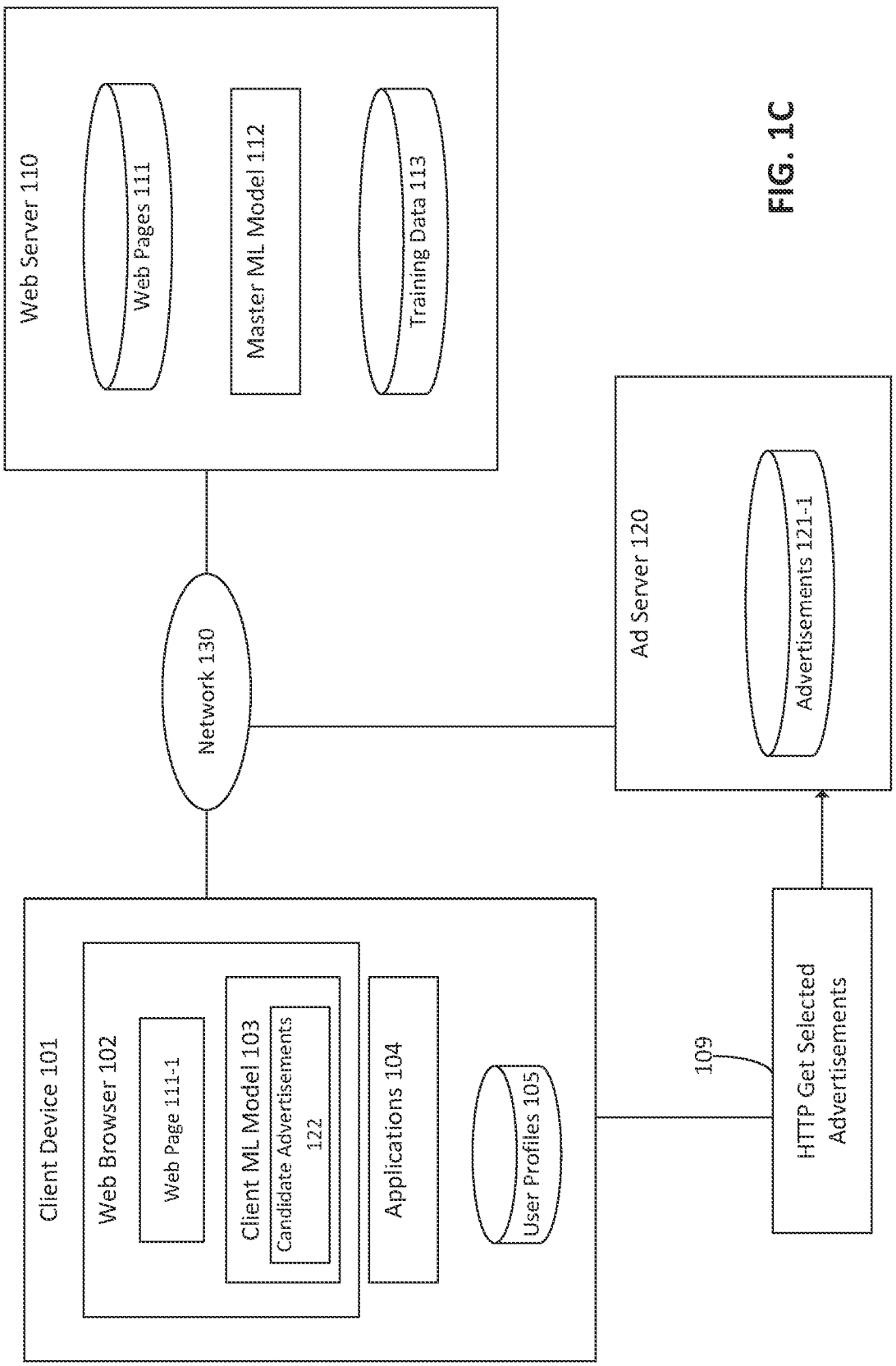

FIG. 1C depicts an embodiment where the web browser 102 begins loading web page 111-1. Doing so may cause the web browser 102 invoke the client ML model 103 to process the candidate advertisements 122. In processing the candidate advertisements 122, client ML model 103 may generally determine one or more of the candidate advertisements 122 is most relevant to the user of the client device 101. For example, the client ML model 103 may compute a respective score for each candidate advertisement 122, where each score reflects the relevance of the corresponding advertisement to the user. In other embodiments, the client ML model 103 may cluster and/or classify the candidate advertisements into one or more relevance levels (e.g., low relevance, medium relevance, high relevance, etc.). The web page 111-1 may include an indication of the number of advertisements to be displayed and selected by the client ML model 103. Therefore, the client ML model 103 may return a corresponding number of advertisements from the candidate advertisements 122 that are most relevant to the user. For example, if the web page 111-1 is to include 5 advertisements, the client ML model 103 may select the 5 candidate advertisements 122 having the highest score.

Once the client ML model 103 selects the most relevant advertisements from the candidate advertisements 122, the web browser 102 may generate one or more HTTP requests 109 and send each HTTP request 109 to the appropriate ad server 120. An HTTP request 109 may generally specify to download one or more of the advertisements selected by the client ML model 103 from the URI associated with the selected advertisement. Doing so may cause the ad server(s) 120 to transmit the advertisements to the client device 101. However, in some embodiments, one or more candidate advertisements 122 may be cached locally on the client device 101. In such embodiments, the cached advertisements need not be downloaded from the ad servers 120.

Figure 1D:
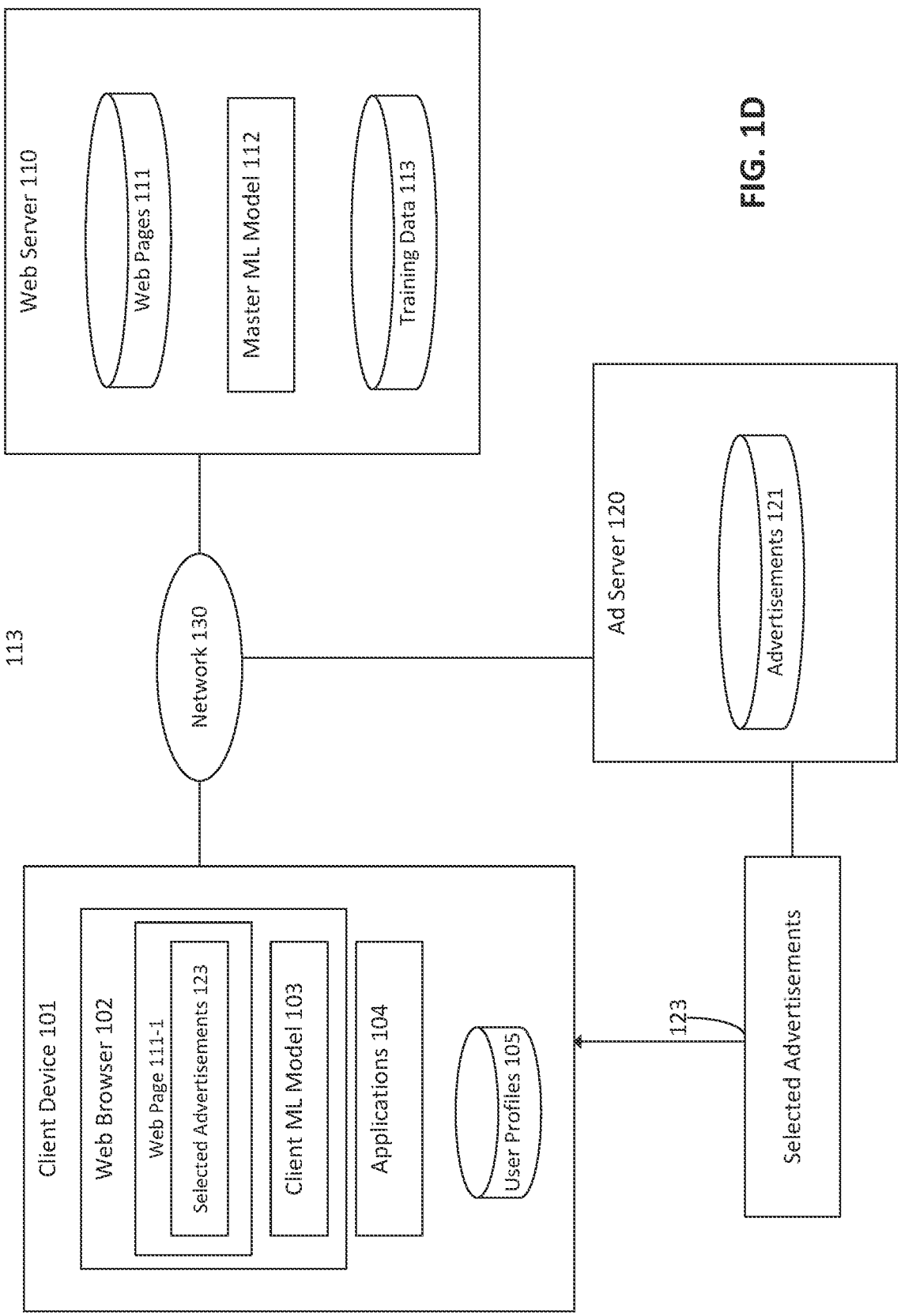

FIG. 1D depicts an embodiment where the ad server(s) 120 transmits one or more advertisements 123 requested by the web browser 102. The advertisements 123 may correspond to the one or more advertisements 121 determined by the client ML model 103 to be most relevant to the requesting user of the client device 101. Once received, the web browser 102 may render the web page 111-1 and/or the selected advertisements 123. Doing so may allow the user to view the web page 111-1 and/or the selected advertisements 123 on a display (not pictured) of the client device 101.

More generally, as the user interacts with the web browser 102, the web browser 102 may record browsing data, clickthrough data, and any other data in the user profile 105 for the user. For example, if the user selects a first advertisement of the selected advertisements 123, the web browser 102 may store an indication in the user profile 105 reflecting that the user clicked on the first advertisement. Over time, the client ML model 103 may be updated (e.g., re-trained) based on the collected data stored in the user profile 105 (as well as any other data present in the user profile 105, such as user-specified interests, preferences, etc.). Furthermore, in some embodiments, the web browser 102 may transmit the user profile 105 and/or client ML model 103 to the web server 110. Doing so may allow the web server 110 to update the training data 113 based on the received user profiles 105 and/or retrain the master ML model 112.

Figure 2:
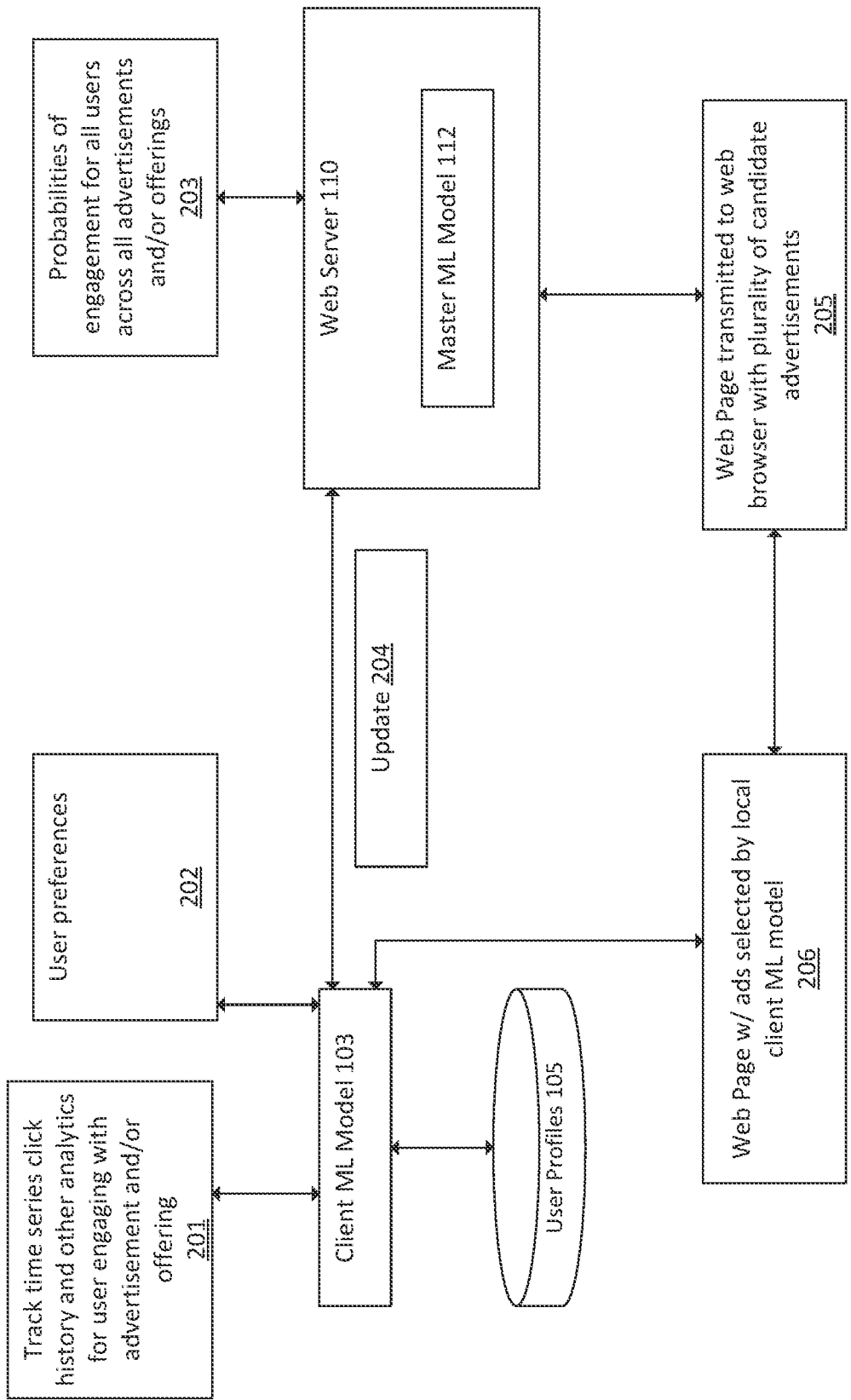
FIG. 2 illustrates an embodiment of techniques to provide dynamic selection of advertisements using deep learning models on client devices.

FIG. 2 is a schematic 200 illustrating an embodiment of techniques to provide dynamic selection of advertisements using deep learning models on client devices. As shown, at block 201, the analytics data is tracked for one or more users associated with a user profile 105 and a client ML model 103. Generally, the analytics data may include time series click histories, browsing data, characteristics of the client devices 101, and any other web analytics data. The data collected over time at block 201 may be used to update the client ML model 103. For example, if the user consistently clicks on sports-related advertisements, the client ML model 103 may be updated to apply greater weights to candidate advertisements that are related to sports.

At block 202, one or more user preferences and/or interests may be received over time. For example, the user may provide input specifying gardening, cooking, etc., as preferences and/or interests in the user profile 105. Similarly, user preferences and/or interests may be generated based on analysis of the data collected at block 201. For example, if the user consistently visits travel-related websites, the web browser 102 may generate travel interest as a user profile element in the user profile 105 for the user. At block 204, any data generated at blocks 201-202 and/or the updated client ML model 103 may be transmitted to the web server 110.

At block 203, the web servers 110 may monitor web analytics data to determine the probability that all users will engage in all advertisements 121. For example, the web server may monitor which web pages 111 are accessed, which advertisements 121 are selected, characteristics of the client devices 101, and any other web analytics data. The data collected at block 203 may generally be used to train the master ML model 112 and retrain the master ML model 112 over time as new data is collected.

At block 205, a web page 111 is transmitted to a web browser 102 of a requesting client device 101. Furthermore, indications (e.g., unique identifiers, URIs, etc.) of one or more candidate advertisements 121 may be transmitted with the web page 111 to the requesting client device 101. At block 206, the client ML model 103 executing in the web browser 102 of the requesting client device 101 selects one or more of the candidate advertisements to display with the web page 111. For example, as stated, the client ML model 103 may compute scores for each received candidate advertisement and select the one or more candidate advertisements having the highest scores. The web browser 102 may then receive the candidate advertisements from the advertisements 121 and display the received advertisements with the web page 111.

Figure 3:
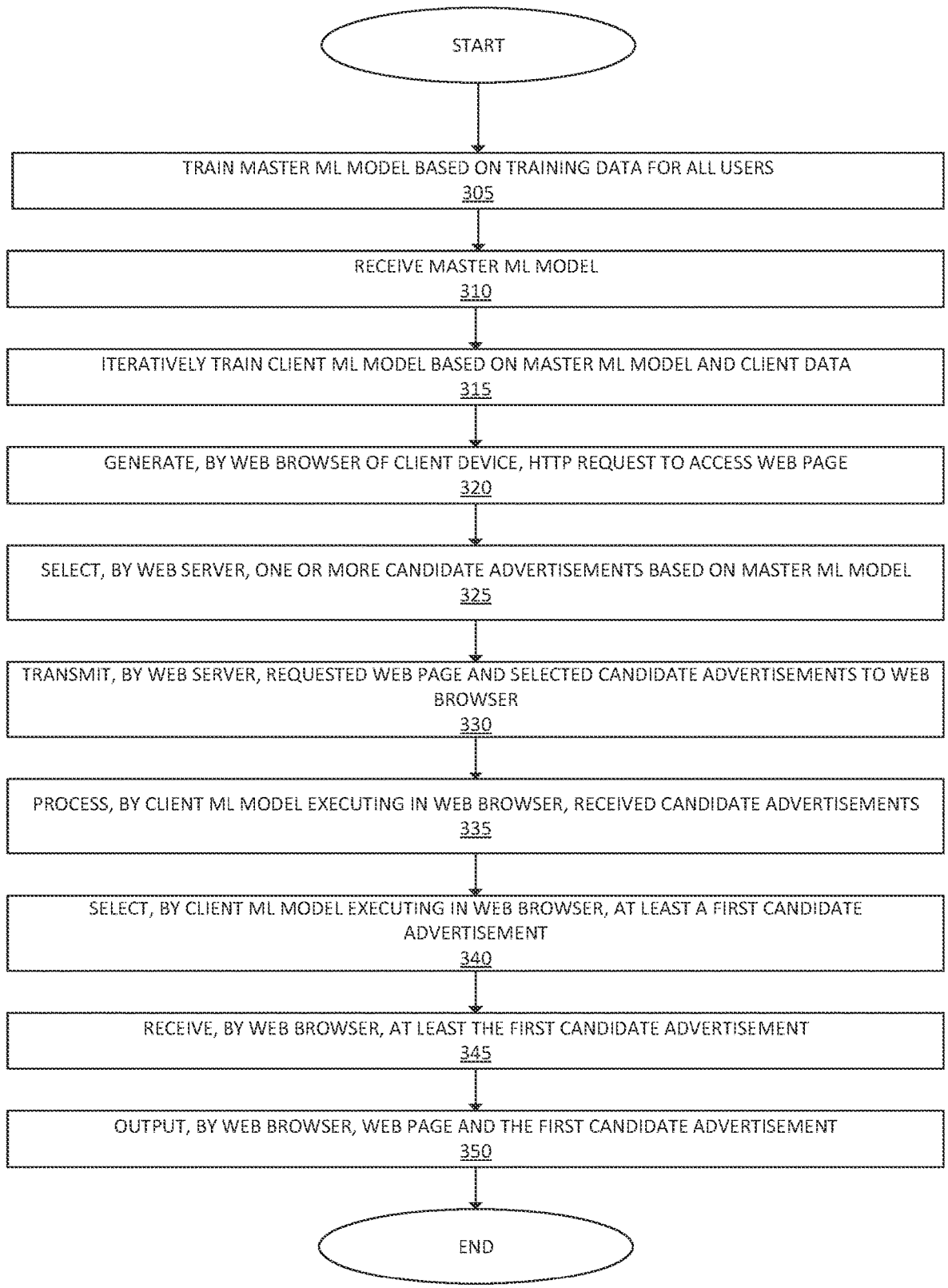
FIG. 3 illustrates an embodiment of a first logic flow.

FIG. 3 illustrates an embodiment of a logic flow 300. The logic flow 300 may be representative of some or all of the operations executed by one or more embodiments described herein. For example, the logic flow 300 may include some or all of the operations to provide dynamic selection of advertisements on client devices using deep learning models. Embodiments are not limited in this context.

As shown, the logic flow 300 begins at block 305, where a master ML model 112 is trained based on training data 113 for all users. The master ML model 112 may be associated with one or more web pages 111, a domain, a portal, or any other entity (e.g., a business, merchant, service provider, etc.). The training data 113 may generally include data describing browsing history, clickthrough data (e.g., which advertisements 121 were selected and which advertisements 121 were not selected by a user), characteristics of the client devices 101, web analytics data, user profile data 105, or any other type of data that may be monitored by the web servers 110 and/or ad servers 120. At block 310, a client device 101 may receive an instance of a master ML model 112, e.g., when creating an account. At block 315, a machine learning algorithm may be applied to the master ML model 112 and data in the user profile 105 for the user to generate the client ML model 103 for the user.

At block 320, the web browser 102 of the client device 101 generates an HTTP request to access a web page 111, e.g., responsive to user input. At block 325, a web server 110 may receive the HTTP request generated at block 320 and select one or more candidate advertisements based on the master ML model 112. Generally, the candidate advertisements comprise one or more advertisements 121 that may be most likely to receive user engagement by any given user. At block 330, the web server 110 transmits the requested web page 111 and indications of the candidate advertisements selected at block 330. For example, the web server 110 may transmit URIs and/or unique identifiers of the candidate advertisements. The web server 110 may further include metadata describing each candidate advertisement, such as an advertisement type, advertiser type, and any other data describing each candidate advertisement.

At block 335, the client ML model 103 executing in the web browser 102 may process the candidate advertisements and associated metadata. Doing so may cause the client ML model 103 to produce scores, rankings, or any other data reflecting a degree of likelihood that the user of the client device 101 will select each candidate advertisements. At block 340, the client ML model 103 and/or the web browser 102 selects at least a first candidate advertisement. For example, the first candidate advertisement may have the highest score computed at block 335. More generally, the client ML model 103 and/or the web browser 102 may select a number of candidate advertisements based on the number of ads required to be displayed in the web page 111.

At block 345, the web browser 102 receives at least the first candidate advertisement from the advertisements 121. More generally, the web browser 102 may receive each candidate advertisement selected at block 340 from the advertisements 121 via the network 130. At block 350, the web browser 102 may output the web page 111 and the advertisements received at block 345 for display.

Figure 4:
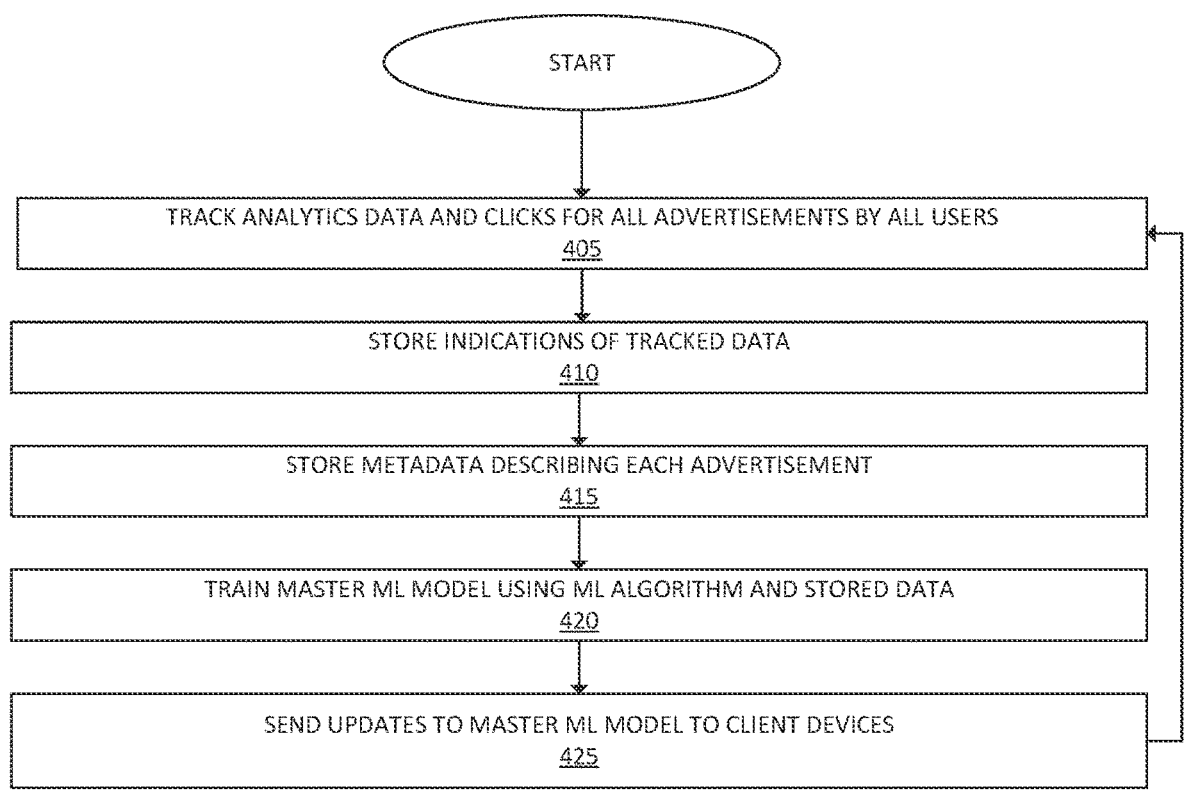
FIG. 4 illustrates an embodiment of a second logic flow.

FIG. 4 illustrates an embodiment of a logic flow 400. The logic flow 400 may be representative of some or all of the operations executed by one or more embodiments described herein. For example, the logic flow 400 may include some or all of the operations to train a master ML model 112. Embodiments are not limited in this context.

As shown, the logic flow 400 begins at block 405, where the web server 110 and/or ad server 120 may track data for all users. For example, the web server 110 and/or ad server 120 may monitor web analytics data such as click data, browsing data, characteristics of the client devices 101, or any other type of data. At block 410, the data tracked at block 405 may be stored as training data 113. At block 415, data describing each advertisement 121 may be stored in the training data 113. For example, the data may comprise advertisement type, advertiser type, and any other data describing each advertisement 121. At block 420, the master ML model 112 is trained using a machine learning algorithm and the training data 113. At block 425, updates to the ML model 112 may be transmitted to the client devices 101. The logic flow 400 may then return to block 405. Doing so allows the master ML model 112 to be updated over time based on the most recently collected data for all users.

Figure 5:
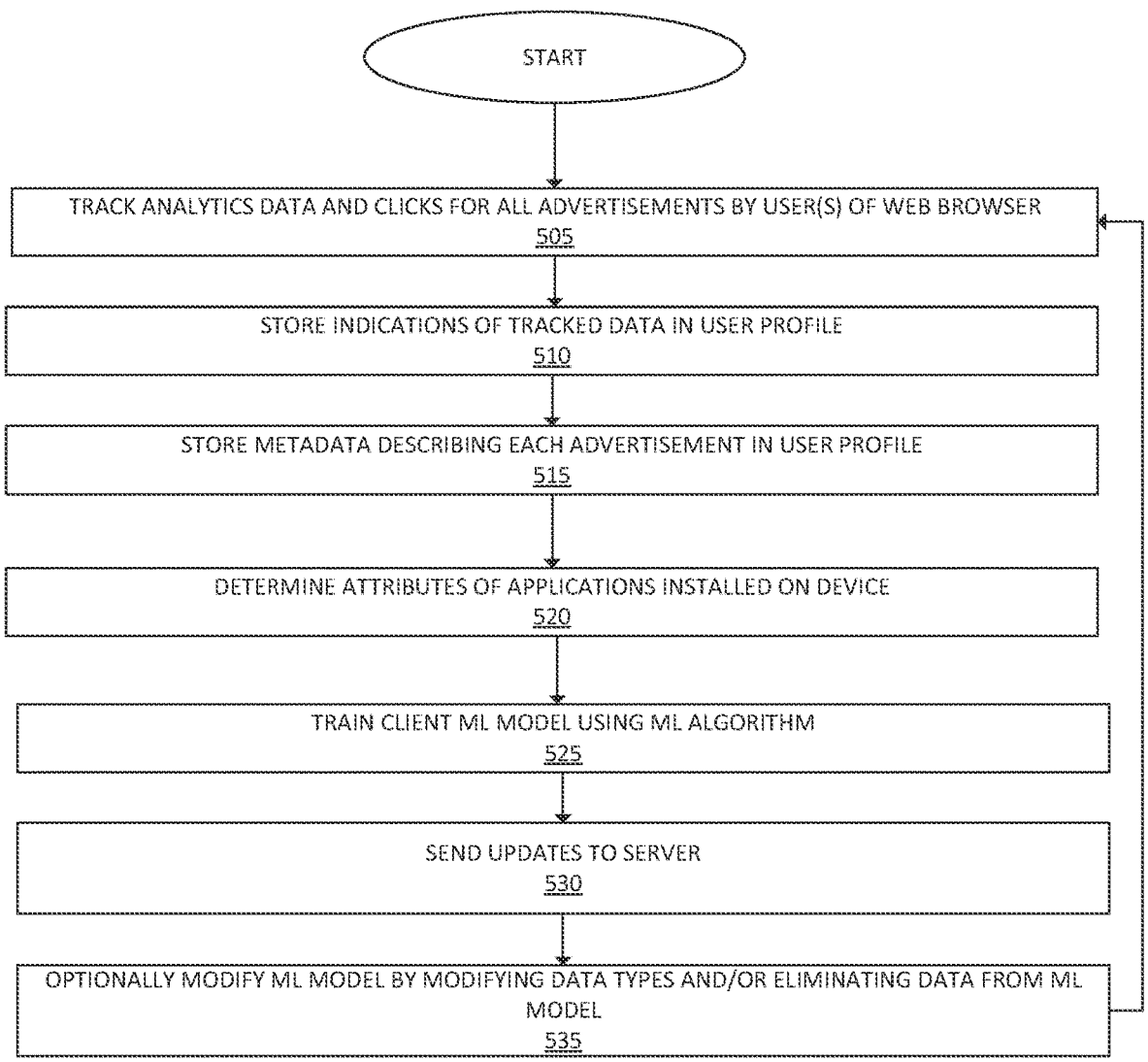
FIG. 5 illustrates an embodiment of a third logic flow.

FIG. 5 illustrates an embodiment of a logic flow 500. The logic flow 500 may be representative of some or all of the operations executed by one or more embodiments described herein. For example, the logic flow 500 may include some or all of the operations performed to train a client ML model 103. Embodiments are not limited in this context.

As shown, the logic flow 500 begins at block 505, where the web browser 102, web server 110, and/or ad server 120 may track data for a user having a user profile 105. For example, the web browser 102, web server 110, and/or ad server 120 may monitor web analytics data such as click data, browsing data, characteristics of the client devices 101 associated with the user, user preferences, or any other type of data. At block 510, the data tracked at block 505 may be stored in the user profile 105. Data provided by the user (e.g., interests, preferences, etc.) may further be stored in the user profile 105. At block 515, data describing each advertisement 121 that the user was presented may be stored in the user profile 105. For example, the data may comprise advertisement type, advertiser type, whether the user clicked on the advertisement 121, and any other data describing each advertisement 121. At block 520, data describing each application 104 installed on the client device 101 is stored in the user profile 105 for the user. For example, application type, application use history, application versions, etc., may be stored in the user profile 105.

At block 525, the client ML model 103 is trained using a machine learning algorithm and the data in the user profile 105. Doing so allows the client ML model 103 to select advertisements 121 that are most relevant to the user associated with the user profile. At block 530, updates to the client ML model 103 may be transmitted to the web server 110. At block 535, the client ML model 103 may be modified. For example, elements of the client ML model 103 may be removed, data types may be converted, etc. Doing so allows the size of the client ML model 103 to be reduced relative to unmodified versions of the client ML model 103. Doing so may improve performance of the client device 101. The logic flow 500 may then return to block 505. Doing so allows the client ML model 103 to be updated over time based on the most recently collected data for the user having a user profile 105.

Figure 6:
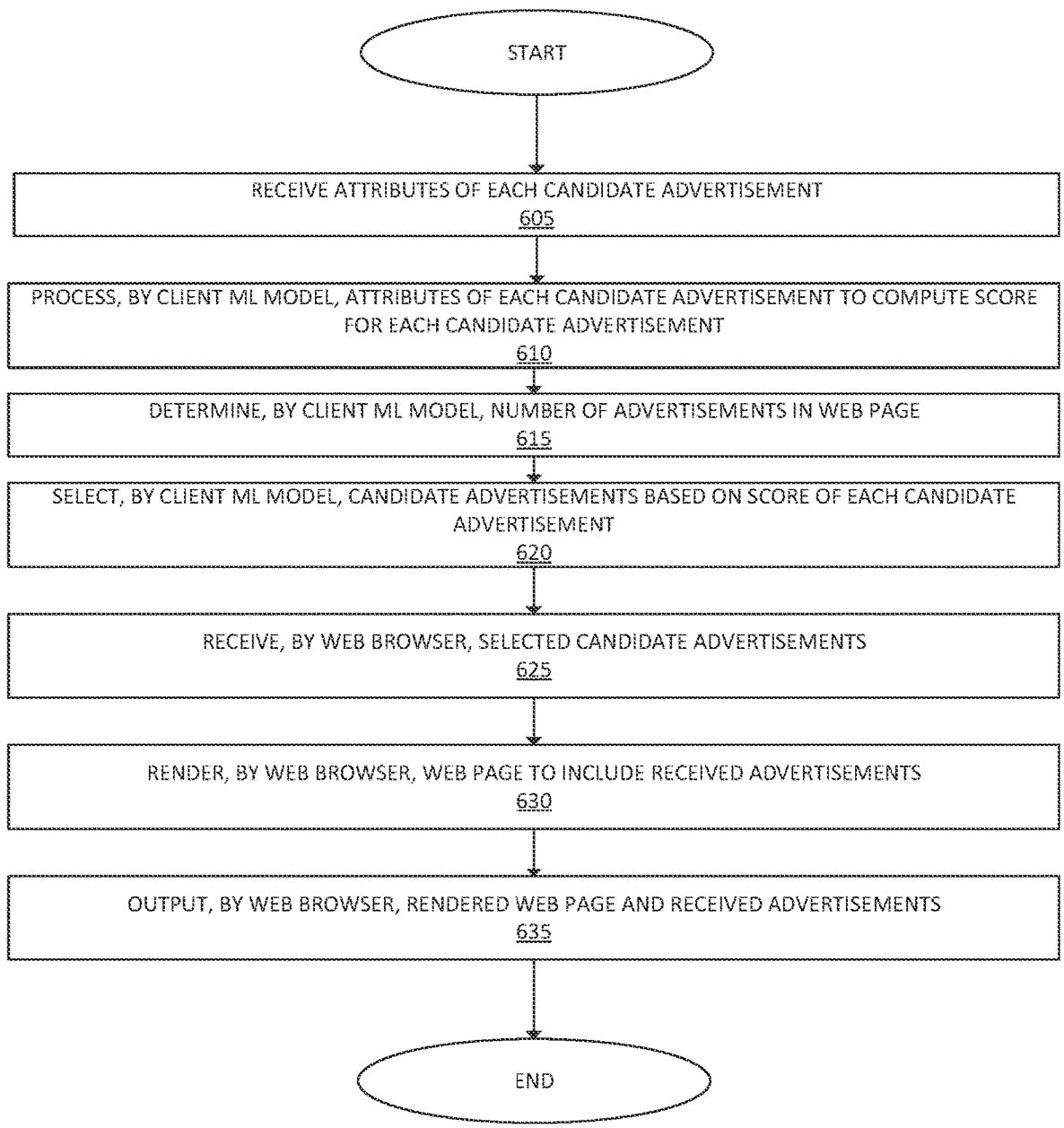
FIG. 6 illustrates an embodiment of a fourth logic flow.

FIG. 6 illustrates an embodiment of a logic flow 600. The logic flow 600 may be representative of some or all of the operations executed by one or more embodiments described herein. For example, the logic flow 600 may include some or all of the operations performed to select advertisements using the client ML model 103. Embodiments are not limited in this context.

As shown, the logic flow 600 begins at block 605, where the web browser 102 receives attributes of a plurality of candidate advertisements from the web server 110 (e.g., responsive to an HTTP request for a web page 111). At block 610, the web browser 102 may cause the client ML model 103 to process attributes of each candidate advertisement received at block 605. Doing so may cause the client ML model 103 to compute a score for each candidate advertisement. At block 615, the client ML model 103 determines a number of advertisement placeholders in the web page 111. For example, the web browser 102 may provide input specifying how many advertisements placeholders are in the web page 111. The web browser 102 may determine the placeholders based on any feasible method, such as analyzing the source code of the web page 111, receiving an indication of the number of advertisement placeholders from the web server 110, etc.

At block 620, the client ML model 103 (and/or the web browser 102) selects one or more candidate advertisements based on the scores computed at block 610. For example, if the number of advertisement placeholders equals six, the six highest-scoring candidate advertisements may be selected. At block 625, the web browser 102 receives the selected candidate advertisements from the associated URI (e.g., from an ad server 120). At block 630, the web browser 102 renders the web page 111 to include the advertisements received at block 625. At block 635, the web browser 102 outputs the rendered web page 111 with advertisements for display.

Figure 7:
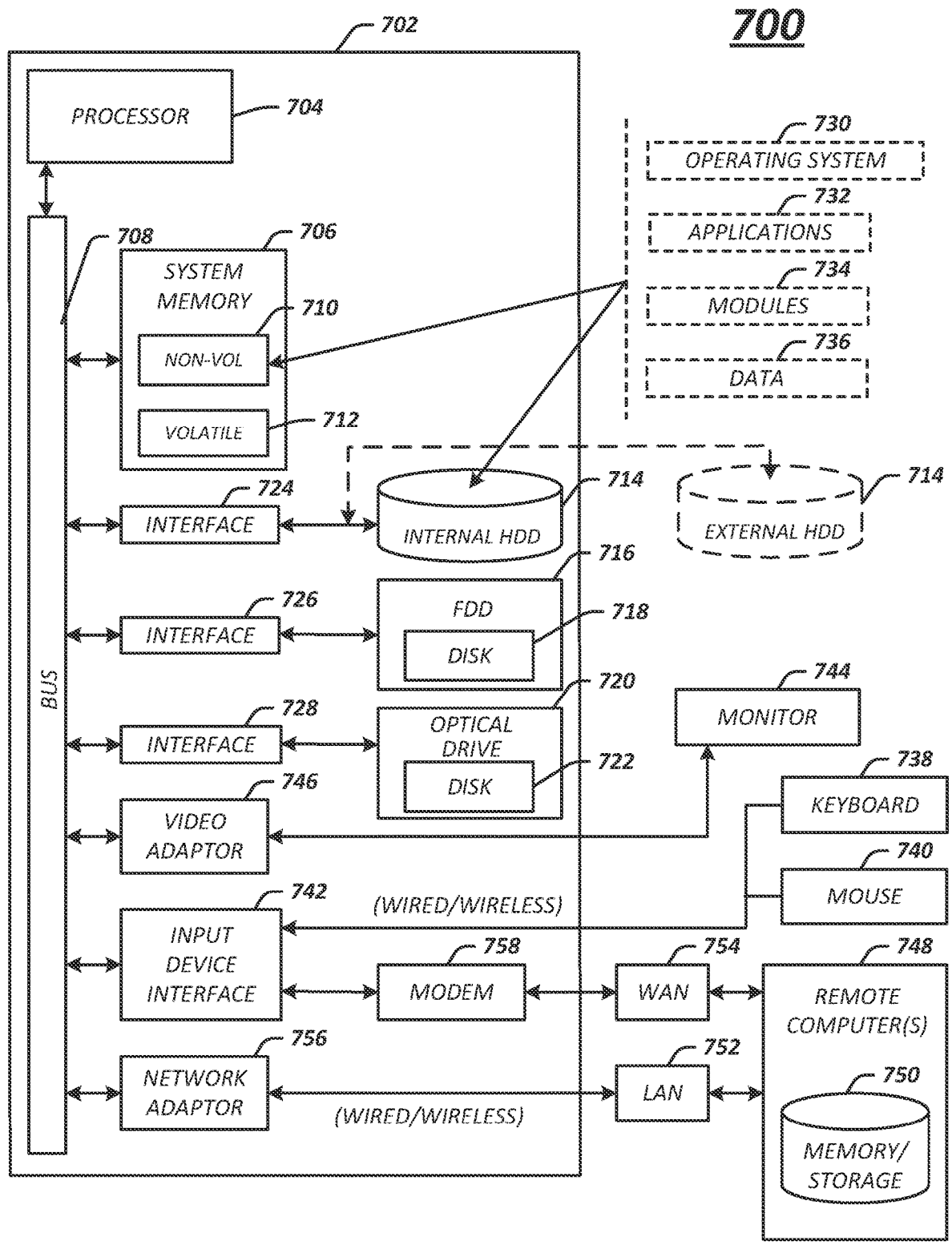
FIG. 7 illustrates an embodiment of a computing architecture.

FIG. 7 illustrates an embodiment of an exemplary computing architecture 700 comprising a computing system 702 that may be suitable for implementing various embodiments as previously described. In various embodiments, the computing architecture 700 may comprise or be implemented as part of an electronic device. In some embodiments, the computing architecture 700 may be representative, for example, of a system that implements one or more components of the system 100. In some embodiments, computing system 702 may be representative, for example, of the client devices 101, web servers 110, and ad servers 120 of the system 100. The embodiments are not limited in this context. More generally, the computing architecture 700 is configured to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 702 includes various common computing elements, such as one or more processors, multi-core processors, co-processors, memory units, chipsets, controllers, peripherals, interfaces, oscillators, timing devices, video cards, audio cards, multimedia input/output (I/O)

components, power supplies, and so forth. The embodiments, however, are not limited to implementation by the computing system 702.

As shown in FIG. 7, the computing system 702 comprises a processor 704, a system memory 706 and a system bus 708. The processor 704 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 704.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computing system 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies. The computing system 702 is generally is configured to implement all logic, systems, methods, apparatuses, and functionality described herein with reference to FIGS. 1-6.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100, e.g., the web browser 102, client ML models 103, applications 104, user profiles 105, web server 110, web pages 111, master ML models 112, ad server 120, and advertisements 121.

A user can enter commands and information into the computing system 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computing system 702. In addition to the monitor 744, a computer typically includes other peripheral output devices, such as speakers, printers, and so forth.

The computing system 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computing system 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 752 and the WAN 754.

When used in a LAN networking environment, the computing system 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computing system 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computing system 702, or portions thereof, can be stored in the remote memory/storage device 750. It will be appreciated that the network connections shown are exemplary and other means of establishing a communications link between the computers can be used.

The computing system 702 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
    receiving, by a web browser from a web server via a network, a web page, a master machine learning (ML) model, and metadata of a plurality of candidate advertisements to display in the web browser with the web page, the master ML model trained based on training data for a plurality of users, the master ML model comprising a plurality of features and a plurality of weight values, respective ones of the plurality of features associated with respective ones of the plurality of weight values;
    generating a client ML model by training the master ML model based on training data stored by the web browser describing prior interactions between one or more users of the web browser and a plurality of previously displayed advertisements, wherein training the master ML model to generate the client ML includes removing a first feature of the plurality of features and the weight value associated with the first feature from the master ML model based on a determination that the first feature is not relevant in determining whether advertisements will be clicked;
    converting, by the web browser, one or more data types of the client ML model from a first format to a second format, the second format having a storage requirement that is less than a storage requirement of the first format and the second format requiring less precision than the first format;
    determining, by the client ML model based on the metadata of the plurality of candidate advertisements, a first candidate advertisement of the plurality of candidate advertisements to display in the web browser with the web page;

receiving, by the web browser, the first candidate advertisement; and outputting, by the web browser, the web page and the first candidate advertisement for display on a display device.

2. The method of claim 1, wherein the trained client ML model includes a second plurality of features, wherein the second plurality of features of the client ML model includes the plurality of features of the master ML model and does not include the first feature.

3. The method of claim 1, further comprising:

computing, by the client ML model based at least in part on the metadata of the plurality of candidate advertisements and one or more interests of the one or more users of the web browser, a respective score reflecting a probability that the one or more users of the web browser will click on the plurality of candidate advertisements; and selecting, by the client ML model, the first candidate advertisement based on the respective score for the candidate advertisements.

4. The method of claim 1, wherein the trained master ML model determines a likelihood that all users accessing the web page will click on the first candidate advertisement.

5. The method of claim 1, wherein the client ML model determines a likelihood that the one or more users of the web browser will click on the first candidate advertisement based at least in part on the training of the client ML model.

6. The method of claim 5, further comprising:

iteratively training the master ML model based on the training data stored by the web browser to generate the client ML model, the training data stored by the web browser comprising: (i) indications of whether the one or more users clicked on each previously displayed advertisement stored in a user profile, (ii) IP addresses of a plurality of client devices displaying the previously displayed advertisements, wherein the plurality of client devices include a client device, (iii) user profile data, (iv) unique identifiers for each previously displayed advertisement, (v) a category of each previously displayed advertisement, and (vi) an entity associated with each previously displayed advertisement.

7. The method of claim 1, the metadata of the plurality of candidate advertisements comprising an advertisement type, an advertiser type, and an advertisement identifier of each of the plurality of candidate advertisements.

8. A non-transitory computer-readable storage medium, the computer-readable storage medium including instructions that when executed by a processor, cause the processor to:

receive, by a web browser from a web server via a network, a web page, a master machine learning (ML) model, and metadata of a plurality of candidate advertisements to display in the web browser with the web page, the master ML model trained based on training data for a plurality of users, the master ML model comprising a plurality of features and a plurality of weight values, respective ones of the plurality of features associated with respective ones of the plurality of weight values;

generate a client ML model by training the master ML model based on training data stored by the web browser describing prior interactions between one or more users of the web browser and a plurality of previously displayed advertisements, wherein training the master ML model to generate the client ML includes removing a first feature of the plurality of features and the weight value associated with the first feature from the master ML model based on a determination that the first feature is not relevant in determining whether advertisements will be clicked;

convert, by the web browser, one or more data types of the client ML model from a first format to a second format, the second format having a storage requirement that is less than a storage requirement of the first format and the second format requiring less precision than the first format;

determine, by the client ML model based on the metadata of the plurality of candidate advertisements, a first candidate advertisement of the plurality of candidate advertisements to display in the web browser with the web page;

receive, by the web browser, the first candidate advertisement; and output, by the web browser, the web page and the first candidate advertisement for display on a display device.

9. The computer-readable storage medium of claim 8, wherein the trained client ML model includes a second plurality of features, wherein the second plurality of features of the client ML model includes the plurality of features of the master ML model and does not include the first feature.

10. The computer-readable storage medium of claim 8, wherein the instructions further cause the processor to:

compute, by the client ML model based at least in part on the metadata of the plurality of candidate advertisements and one or more interests of the one or more users of the web browser, a respective score reflecting a probability that the one or more users of the web browser will click on the plurality of candidate advertisements; and select, by the client ML model, the first candidate advertisement based on the respective score for the candidate advertisements.

11. The computer-readable storage medium of claim 8, wherein the trained master ML model determines a likelihood that all users access the web page will click on the first candidate advertisement.

12. The computer-readable storage medium of claim 8, wherein the client ML model determines a likelihood that the one or more users of the web browser will click on the first candidate advertisement based at least in part on the training of the client ML model.

13. The computer-readable storage medium of claim 12, wherein the instructions further cause the processor to:

iteratively train the master ML model based on the training data stored by the web browser to generate the client ML model, the training data stored by the web browser comprising: (i) indications of whether the one or more users clicked on each previously displayed advertisement stored in a user profile, (ii) IP addresses of a plurality of client devices displaying the previously displayed advertisements, wherein the plurality of client devices include a client device, (iii) user profile data, (iv) unique identifiers for each previously displayed advertisement, (v) a category of each previously displayed advertisement, and (vi) an entity associated with each previously displayed advertisement.

14. The computer-readable storage medium of claim 8, the metadata of the plurality of candidate advertisements comprising an advertisement type, an advertiser type, and an advertisement identifier of each of the plurality of candidate advertisements.

15. A computing apparatus comprising:
a processor, and
a memory storing instructions that, when executed by the processor, cause the processor to:
receive, by a web browser from a web server via a network, a web page, a master machine learning (ML) model, and metadata of a plurality of candidate advertisements to display in the web browser with the web page, the master ML model trained based on training data for a plurality of users, the master ML model comprising a plurality of features and a plurality of weight values, respective ones of the plurality of features associated with respective ones of the plurality of weight values;
generate a client ML model by training the master ML model based on training data stored by the web browser describing prior interactions between one or more users of the web browser and a plurality of previously displayed advertisements, wherein training the master ML model to generate the client ML includes removing a first feature of the plurality of features and the weight value associated with the first feature from the master ML model based on a determination that the first feature is not relevant in determining whether advertisements will be clicked;
convert, by the web browser, one or more data types of the client ML model from a first format to a second format, the second format having a storage requirement that is less than a storage requirement of the first format and the second format requiring less precision than the first format;
determine, by the client ML model based on the metadata of the plurality of candidate advertisements, a first candidate advertisement of the plurality of candidate advertisements to display in the web browser with the web page;
receive, by the web browser, the first candidate advertisement; and
output, by the web browser, the web page and the first candidate advertisement for display on a display device.

16. The computing apparatus of claim 15, wherein the trained client ML model includes a second plurality of features, wherein the second plurality of features of the client ML model includes the plurality of features of the master ML model and does not include the first feature.

17. The computing apparatus of claim 15, wherein the instructions further cause the processor to:
compute, by the client ML model based at least in part on the metadata of the plurality of candidate advertisements and one or more interests of the one or more users of the web browser, a respective score reflecting a probability that the one or more users of the web browser will click on the plurality of candidate advertisements; and
select, by the client ML model, the first candidate advertisement based on the respective score for the candidate advertisements.

18. The computing apparatus of claim 15, wherein the trained master ML model determines a likelihood that all users access the web page will click on the first candidate advertisement.

19. The computing apparatus of claim 15, wherein the client ML model determines a likelihood that the one or more users of the web browser will click on the first candidate advertisement based at least in part on the training of the client ML model.

20. The computing apparatus of claim 19, wherein the instructions further cause the processor to:
iteratively train the master ML model based on the training data stored by the web browser to generate the client ML model, the training data stored by the web browser comprising: (i) indications of whether the one or more users clicked on each previously displayed advertisement stored in a user profile, (ii) IP addresses of a plurality of client devices displaying the previously displayed advertisements, wherein the plurality of client devices include a client device, (iii) user profile data, (iv) unique identifiers for each previously displayed advertisement, (v) a category of each previously displayed advertisement, and (vi) an entity associated with each previously displayed advertisement.

* * * * *